US011514002B2

(12) United States Patent
Shemer et al.

(10) Patent No.: US 11,514,002 B2
(45) Date of Patent: Nov. 29, 2022

(54) INDEXING SPLITTER FOR ANY PIT REPLICATION (71) Applicant: EMC IP Holding Company LLC, Hopkinton, MA (US)

(72) Inventors: Jehuda Shemer, Kfar Saba (IL); Alex Solan, Tel Aviv (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 494 days.

(21) Appl. No.: 16/557,791

(22) Filed: Aug. 30, 2019

(65) Prior Publication Data
US 2021/0064576 A1 Mar. 4, 2021

(51) Int. Cl.
G06F 16/00 (2019.01)
G06F 16/178 (2019.01)
G06F 9/455 (2018.01)
G06F 11/14 (2006.01)
G06F 16/174 (2019.01)

(52) U.S. Cl.
CPC ........ *G06F 16/178* (2019.01); *G06F 9/45558* (2013.01); *G06F 11/1453* (2013.01); *G06F 11/1464* (2013.01); *G06F 16/1748* (2019.01); *G06F 2009/45579* (2013.01); *G06F 2009/45583* (2013.01); *G06F 2009/45595* (2013.01); *G06F 2201/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,880,474 B2* | 11/2014 | Mason | ................ | G06F 11/1446 707/649 |
| 9,507,845 B1* | 11/2016 | Natanzon | ............ | G06F 11/2094 |
| 9,594,636 B2* | 3/2017 | Mortensen | ............ | G06F 9/4881 |
| 9,910,739 B1* | 3/2018 | Natanzon | ............ | G06F 11/1458 |
| 10,042,710 B2* | 8/2018 | Mutalik | ................ | G06F 3/0619 |
| 10,055,424 B2* | 8/2018 | Mortensen | .......... | G06F 11/2094 |
| 10,114,581 B1* | 10/2018 | Natanzon | ................ | G06F 3/065 |
| 10,353,603 B1* | 7/2019 | Baruch | ................. | G06F 3/0619 |
| 10,423,634 B1* | 9/2019 | Shemer | ................. | G06F 16/2477 |
| 10,540,236 B2* | 1/2020 | Mutalik | .............. | G06F 11/1464 |
| 10,620,851 B1* | 4/2020 | Shemer | ................. | G06F 16/122 |

(Continued)

*Primary Examiner* — Farhan M Syed
(74) *Attorney, Agent, or Firm* — Womble Bond Dickinson (US) LLP (57) ABSTRACT

A method, apparatus, and system for transmitting file system metadata from an indexing splitter running in a VM to a source side RPA is disclosed. The operations comprise: capturing one or more file system events in a production virtual machine (VM) at an indexing splitter; transmitting file system metadata representing the captured file system events from the indexing splitter to a data splitter, the data splitter being an agent running on a host system hosting the VM; transmitting the file system metadata inside one or more special input/output (I/O) commands associated with a predetermined tag from the data splitter to a source side replication protection appliance (RPA) alongside regular storage system I/O command data; identifying the special I/O commands at the source side RPA based on the predetermined tag; and recovering the file system metadata from the special I/O commands at the source side RPA.

15 Claims, 5 Drawing Sheets

(56) References Cited

U.S. PATENT DOCUMENTS

| | | | |
|---|---|---|---|
| 10,725,967 B1* | 7/2020 | Natanzon | G06F 16/128 |
| 10,853,314 B1* | 12/2020 | Shemer | G06F 16/122 |
| 2010/0191783 A1* | 7/2010 | Mason | G06F 16/1873 |
| | | | 711/E12.001 |
| 2013/0024424 A1* | 1/2013 | Prahlad | G06F 16/122 |
| | | | 707/694 |
| 2013/0339297 A1* | 12/2013 | Chen | G06F 16/273 |
| | | | 707/624 |
| 2013/0339302 A1* | 12/2013 | Zhang | G06F 16/273 |
| | | | 707/649 |
| 2013/0339303 A1* | 12/2013 | Potter | G06F 11/1461 |
| | | | 707/649 |
| 2013/0339319 A1* | 12/2013 | Woodward | G06F 16/128 |
| | | | 707/692 |
| 2015/0012495 A1* | 1/2015 | Prahlad | H04L 67/5682 |
| | | | 707/640 |
| 2015/0052111 A1* | 2/2015 | Mason, Jr. | G06F 11/1446 |
| | | | 707/684 |
| 2015/0347548 A1* | 12/2015 | Mortensen | G06F 11/2094 |
| | | | 707/618 |
| 2016/0077926 A1* | 3/2016 | Mutalik | G06F 16/1844 |
| | | | 711/162 |
| 2017/0139950 A1* | 5/2017 | Mortensen | G06F 11/1451 |
| 2018/0322140 A1* | 11/2018 | Mortensen | G06F 11/1451 |
| 2019/0251468 A1* | 8/2019 | Guillame-Bert | G06N 5/003 |

\* cited by examiner

INDEXING SPLITTER FOR ANY PIT REPLICATION

FIELD OF THE INVENTION

Embodiments of the present invention relate generally to data storage systems. More particularly, embodiments of the invention relate to continuous backup storage systems with any point in time replication capabilities.

BACKGROUND

Computer data is vital to today's organizations, and a significant part of protection against disasters is focused on data protection. Organizations operate with systems that store and process terabytes of data.

A conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time (PiT) within a recent history. Continuous data protection systems may enable recovery as close as possible to any specified PiT within a recent history.

Continuous data protection typically uses a technology referred to as "journaling," whereby a log is kept of changes made to the backup storage. During a recovery, the journal entries serve as successive "undo" information, enabling rollback of the backup storage to previous PiTs. Journaling was first implemented in database systems, and was later extended to broader data protection.

An indexing splitter is an agent running on a production system (e.g., a virtual machine "VM") that captures and sends out a stream of operating system (OS) level and/or file system level operation metadata.

A current indexing splitter communicates directly with a replication protection appliance (RPA) through a communication channel such as an Internet Protocol (IP) connection. This requires that the agent (i.e., the indexing splitter) in the OS running on the VM be configured and exposed to the RPA. It also requires that the VM have networking configured and that there be IP connectivity between the VM and the RPA (e.g., in the same broadcast domain).

These requirements create complications and restrictions on system networking design and configuration complexity. For example, networking needs to be set up for the VM. The VM must have at least a virtual Network Interface Card (vNic), port assignment and an IP address. Network connectivity to the RPA from the VM is required.

Furthermore, the current indexing splitter requires the IP address of the RPA and connectivity parameters to be configured. In other words, RPA credentials and its IP address need to be configured in the agent in the VM. This may require either manual setup or a mechanism for the agent to automatically retrieve the information.

Moreover, only loose synchronization is possible between the information provided by the indexing splitter and the data stream that comprises write transactions conducted on the storage system because they are transmitted to the RPA through unconnected systems and can only be loosely correlated by time proximity.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to embodiments of the disclosure, an indexing splitter is an OS level agent that runs on a production system (e.g., a VM) and sends OS/file system metadata to the RPA, over either an IP channel or some other communication channel. The indexing splitter intercepts file system events and generates a stream of file system events.

A data splitter (or simply, a splitter) is an agent utilized in a continuous backup storage system with any point in time (PiT) replication and restoration capabilities for production virtual machines (e.g., a system with the RecoverPoint for Virtual Machines "RP4VMs" functionality provided by Dell/EMC). It should be appreciated that the data splitter captures VM related data, and is connected to the RPA via a suitable communication channel (e.g., a fiber channel).

One embodiment relates to a communication mechanism for the indexing splitter that is easier to configure, more efficient, and better synchronized with the storage system data stream. In particular, the communication mechanism comprises enabling direct communication between the indexing splitter and the data splitter and piggybacking the metadata captured and provided by the indexing splitter on the data splitter communication to the RPA.

Piggybacking the indexing splitter communication on the data splitter communication is associated with several advantages. The main advantages include simplicity of setup and tight synchronization between the storage system data stream and the indexing metadata stream. This enables more accurate searches for better targeting of applicable PiTs.

Embodiments of the disclosure relate to a method, apparatus, and system for transmitting file system metadata from an indexing splitter running in a VM to a source side RPA. One or more file system events in a production virtual machine (VM) may be captured at an indexing splitter, the indexing splitter being an agent running in the VM. File system metadata representing the captured file system events may be transmitted from the indexing splitter to a data splitter, the data splitter being an agent running on a host system hosting the VM. The file system metadata may be transmitted inside one or more special I/O commands associated with a predetermined tag from the data splitter to a source side RPA alongside regular storage system I/O command data. The special I/O commands may be identified at the source side RPA based on the predetermined tag. The file system metadata may be recovered from the special I/O commands at the source side RPA.

In one embodiment, the file system metadata may be transmitted from the indexing splitter to the data splitter via a pipe or a socket established between the indexing splitter and the data splitter, and upon identification by the data splitter of the file system metadata, the special I/O commands embedding the file system metadata may be generated at the data splitter.

In one embodiment, the special I/O commands embedding the file system metadata may be generated at the indexing splitter. In one embodiment, the file system metadata may be transmitted inside the special I/O commands from the indexing splitter to the data splitter alongside regular storage system I/O command data via an I/O path between the indexing splitter and the data splitter, and upon identification by the data splitter of the special I/O commands, the special I/O commands may be forwarded from the data splitter to the source side RPA.

In one embodiment, regular storage system I/O command data representing write transactions and the recovered file system metadata may be transmitted together from the source side RPA to a target side RPA in an interleaved fashion.

In one embodiment, the target side RPA may update a target side storage system based on the write transactions, and may store the write transactions and the file system events in a journal.

In one embodiment, bookmarks may be generated at the source side RPA based on the file system metadata.

Figure 1:
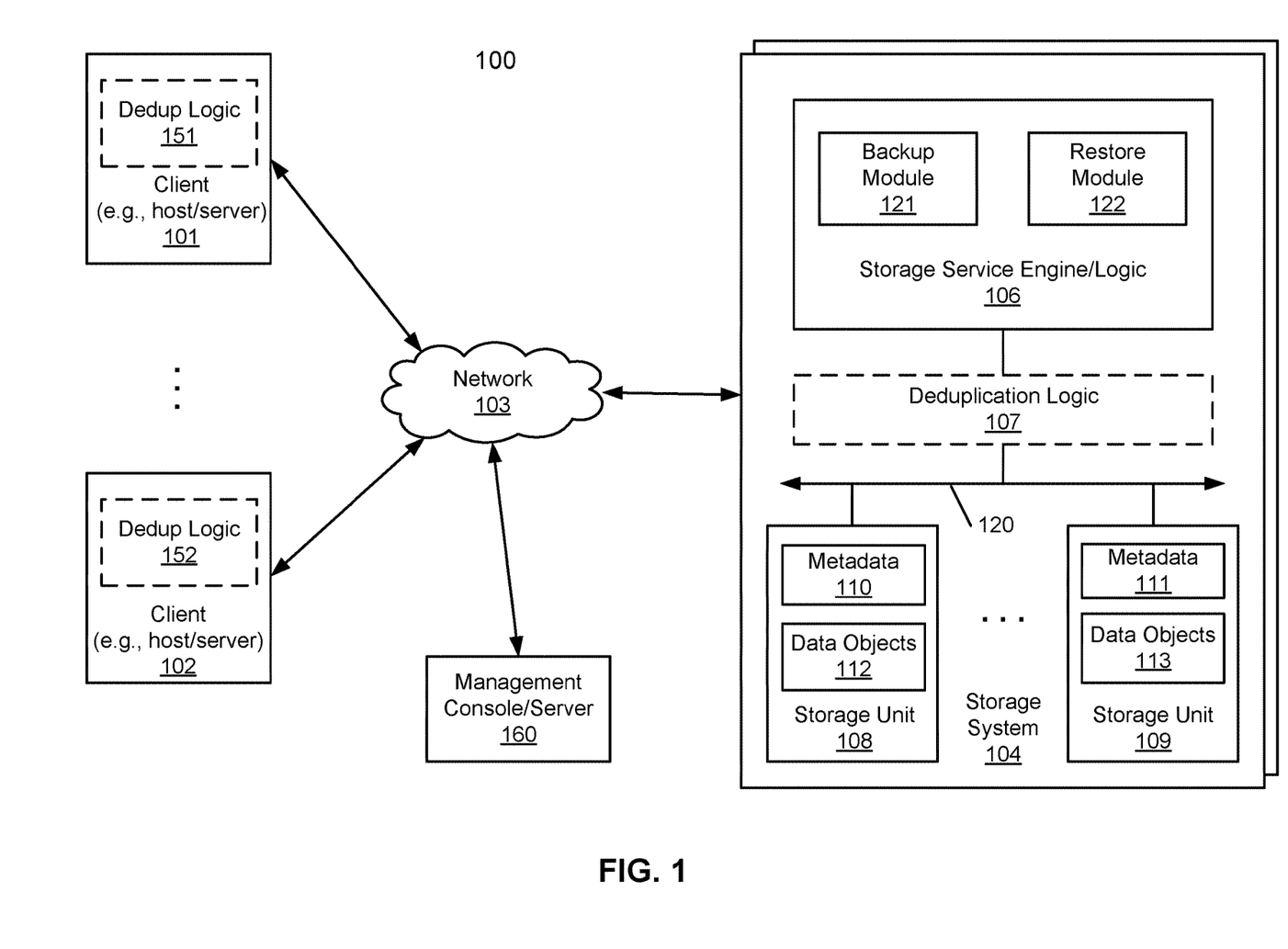
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

The following definitions are employed throughout the specification and claims.

A backup site may be a facility where replicated production site data is stored; the backup site may be located in a remote site or at the same location as the production site.

A Data Protection Appliance (DPA), or alternatively and interchangeably, a Replication Protection Appliance (RPA), may be a computer or a cluster of computers, or a set of processes that serve as a data protection appliance, and may be responsible for data protection services including inter alia data replication of a storage system, and journaling of I/O requests issued by a host computer to the storage system.

A journal may be a record of write transactions issued to a storage system; it is used to maintain a duplicate storage system, and to enable rolling back of the duplicate storage system to a previous point in time.

A logical unit may be a logical entity provided by a storage system for accessing data from the storage system.

A source side may be a transmitter of data within a data replication workflow. During normal operation a production site is the source side; and during data recovery a backup site is the source side.

A target side may be a receiver of data within a data replication workflow. During normal operation a backup site is the target side, and during data recovery a production site is the target side.

A (data) splitter may be an agent running either on a production host, a switch, or a storage array which can intercept Inputs/Outputs (I/O) and split them to a DPA/RPA and to the storage array, fail I/O, redirect I/O, or do any other manipulation to the I/O.

The marking on splitter may be a mode in a splitter where intercepted I/Os are not split to an appliance and the storage, but changes (metadata) are tracked in a list and/or a bitmap and I/O is immediately sent down to the I/O stack.

A typical continuous backup storage system includes two replication protection appliances (RPAs), a source side RPA and a target side RPA. An RPA performs various data protection services, such as data replication of a storage system, and journaling of I/O requests issued by a host computer to source side storage system data. When acting as a target side RPA, an RPA may also enable rollback of data to an earlier PiT, and processing of rolled back data at the target site. Each RPA is either a physical computer that includes inter alia one or more conventional CPUs and internal memory or a virtual machine.

A production VM may be running on a source side host computer. The VM image may be stored either at the host computer or in a separate storage system. Therefore, the two RPAs may enable local, remote and, concurrent local and remote replication with continuous data protection for recovery of VMs to any PiT, wherein a journal-based implementation holds the PiT information of all changes made to the protected data.

In one embodiment, RPAs may be standalone devices. In other embodiments, they may be integrated into storage systems, or integrated into host computers. Both source and target side RPAs communicate with their respective host computers through communication lines such as fiber channels using, for example, SCSI commands.

In accordance with an embodiment of the present disclosure, the host computer on the source side includes a data splitter. The data splitter is an agent and may intercept SCSI commands issued by the host computer, via a host device to a logical unit that is accessible to the host computer. In accordance with an embodiment of the present disclosure, The data splitter may act on an intercepted SCSI commands issued to a logical unit, in one of the following ways:

Send the SCSI commands to its intended logical unit.

Redirect the SCSI command to another logical unit.

Split the SCSI command by sending it first to the respective RPA. After the RPA returns an acknowledgement, send the SCSI command to its intended logical unit.

Fail a SCSI command by returning an error return code.

Delay a SCSI command by not returning an acknowledgement to the host computer.

The data splitter may handle different SCSI commands, differently, according to the type of the command. For example, a SCSI command inquiring about the size of a certain logical unit may be sent directly to that logical unit, while a SCSI write command may be split and sent first to the source side RPA. The data splitter may also change its behavior for handling SCSI commands, for example as a result of an instruction received from the source side RPA.

Specifically, the behavior of the data splitter generally corresponds to the behavior of its associated RPA with respect to the logical unit of the host device. When an RPA behaves as a source side RPA for a certain logical unit, then during normal course of operation, the associated data splitter splits I/O requests issued by a host computer to the host device corresponding to that logical unit. Similarly, when an RPA behaves as a target device for a certain logical unit, then during normal course of operation, the associated splitter fails I/O requests issued by host computer to the host device corresponding to that logical unit.

Communication between the data splitter and the associated RPA may use any suitable protocol, such as fiber channel, or SCSI over fiber channel. The communication may be direct, or via a logical unit exposed by the RPA.

In an embodiment of the present disclosure, the data splitter may be a driver located in the host computer.

In accordance with an embodiment of the present disclosure, in production mode the source side data splitter replicates SCSI I/O requests. A replicated SCSI I/O request is sent to the source side RPA. After receiving an acknowledgement from the target side RPA, the data splitter then sends the SCSI I/O request to the relevant logical unit. Only after receiving a second acknowledgement from the storage system may the host computer initiate another I/O request.

When the source side RPA receives a replicated SCSI write request from the data splitter, the source side RPA transmits certain I/O information characterizing the write request, packaged as a "write transaction", over a suitable communication channel (e.g., a local area network "LAN" or a wide area network "WAN") to the RPA on the target side, for journaling and for incorporation within target storage system.

While in production mode, the target side RPA receives replicated data stream from the source side RPA, and performs journaling and writing to the target side storage system. When applying write operations to the target storage system, the target side RPA acts as an initiator.

During a recovery mode, the target side RPA may undo the write transactions in the journal, so as to restore the production side storage system to the state it was at, at an earlier time. The target side RPA may include a journal processor for managing the journal.

Therefore, the source side and target side RPAs, the data splitter, and the data stream which comprises the write transactions stored in the journal at the target side enable the PiT replication and restoration of one or more VMs running on the source side host computer (e.g., the RP4VMs functionality).

Figure 2:
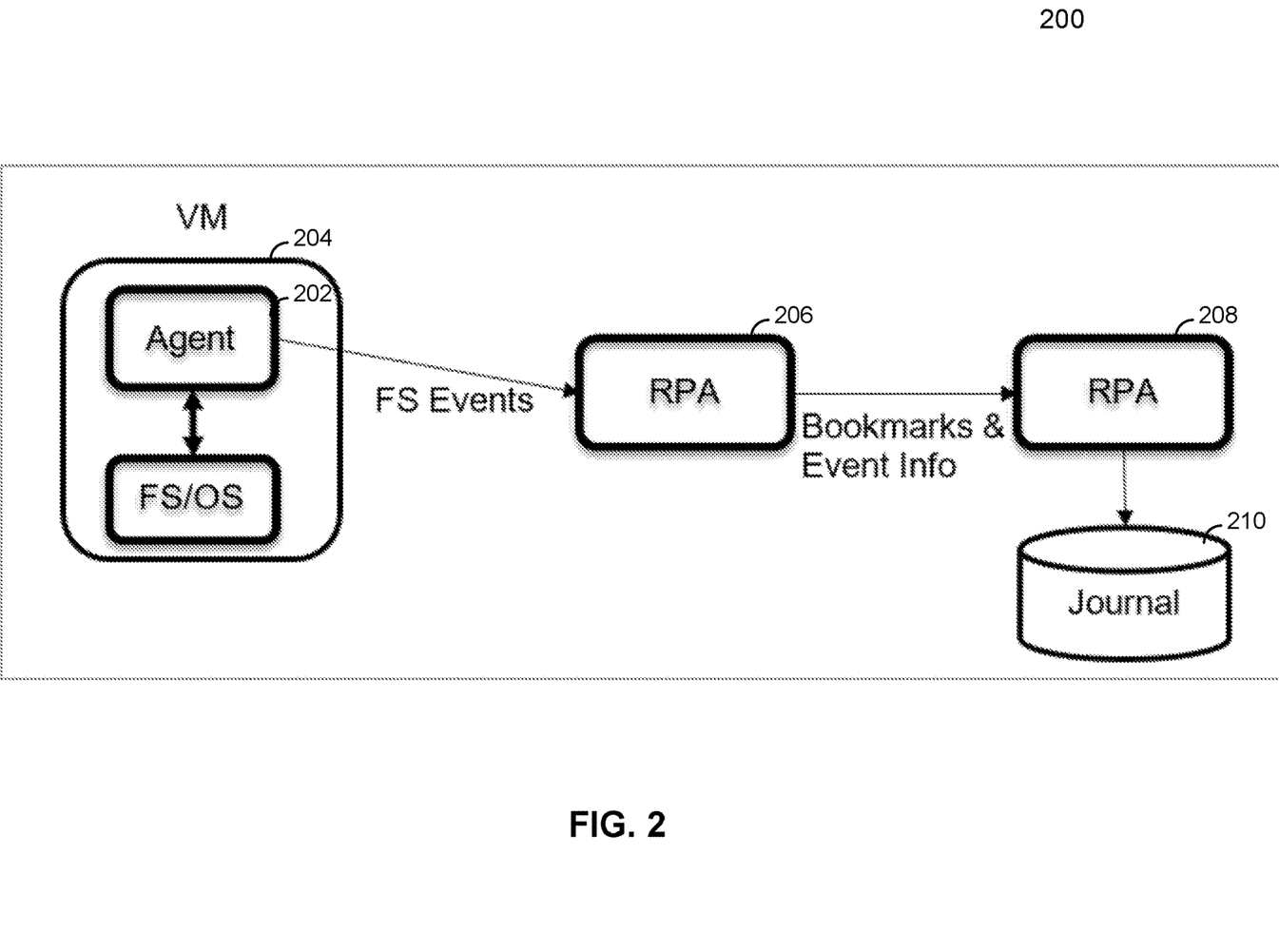
FIG. 2 is a block diagram illustrating a current environment in which an indexing splitter operates.

Referring to FIG. 2, a block diagram illustrating a current environment 200 in which an indexing splitter operates is shown. The indexing splitter is an agent 202 running on the production system (e.g., a VM 204) that captures and sends out a stream of OS level and/or file system level operation metadata. The agent 202 typically captures all file system related activities, such as: Create file; Remove file; Move file; Create directory; Remove directory; Open file for write/modify; Close file, etc.

The metadata stream representing the OS/file system events is first sent to the source side RPA 206 over a communication channel such as an IP connection. It should be appreciated that the indexing splitter 202 and the data splitter (not shown in FIG. 2) perform different functions, and the indexing splitter 202 does not replace the data splitter. The metadata stream representing the OS/file system events indicates changes in files or directories, and is useful during restoration operations for searches for candidate PiTs. In one embodiment, the source side RPA 206 may transmit the metadata stream to the target side RPA 208 for storage in the journal 210. The target side RPA 208 may further generate bookmarks and/or indexes useful in PiT restoration based on the metadata stream. In yet another embodiment, the source side RPA 206 may generate bookmarks and/or indexes useful in PiT restoration based on the metadata stream, and may transmit the bookmarks and/or indexes to the target side RPA 208.

Figure 3:
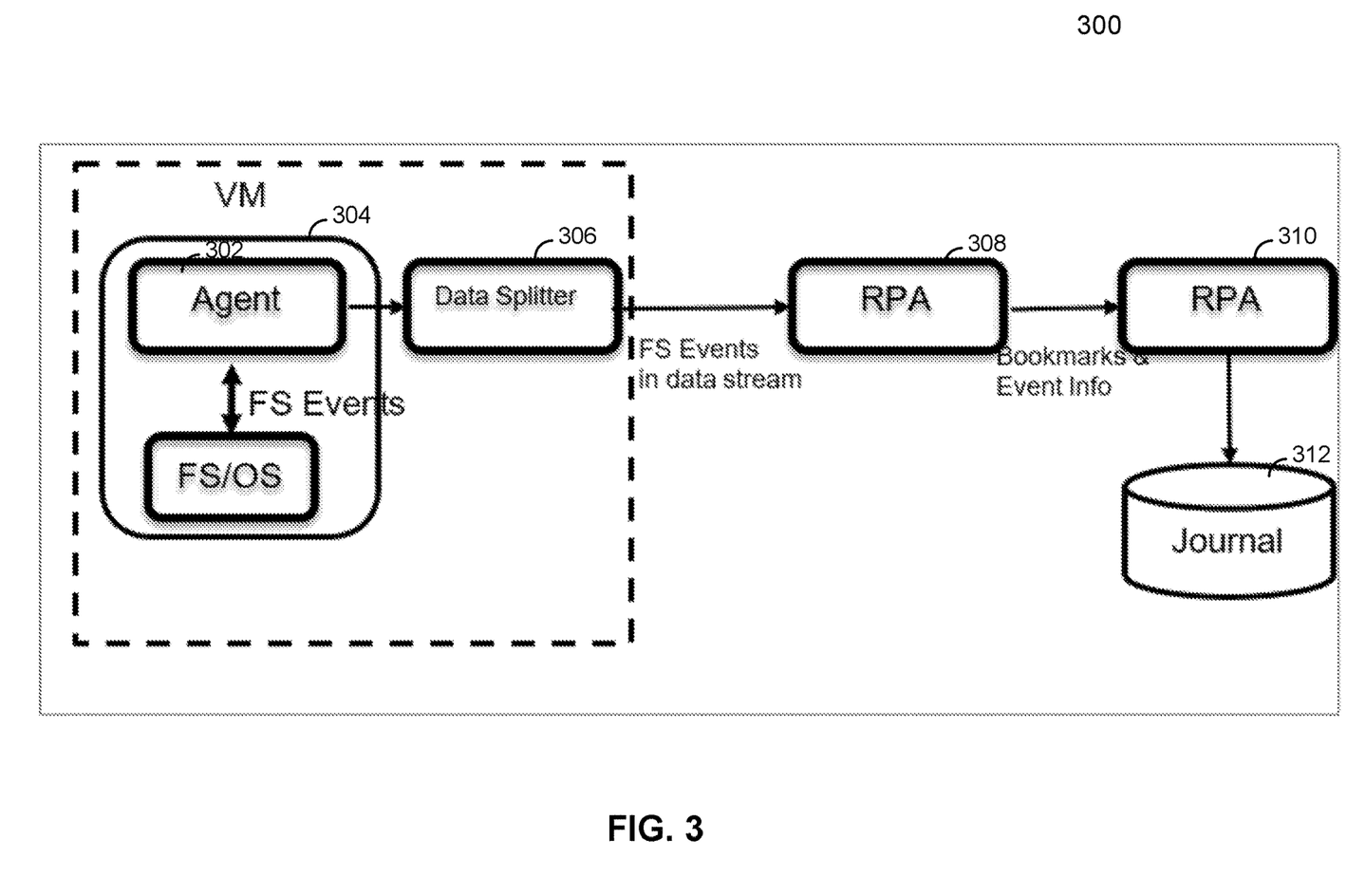
FIG. 3 is a block diagram illustrating an example method for transmitting a metadata stream from an indexing splitter to a source side RPA according to one embodiment.

Referring to FIG. 3, a block diagram illustrating an example method 300 for transmitting a metadata stream from an indexing splitter to a source side RPA according to one embodiment is shown. Similar to the indexing splitter 202 of FIG. 2, the indexing splitter in FIG. 3 is an agent 302 running on the production system (e.g., a VM 304) that captures and sends out a stream of OS level and/or file system level operation metadata. The data splitter 306 is similar to a current source side data splitter in a continuous data protection system described above. In particular, the data splitter 306 captures VM related data, and is connected to the source side RPA 308 via a suitable communication channel (e.g., a fiber channel). Instead of communicating directly with the source side RPA 308 over an IP connection, in one embodiment, the indexing splitter 302 may communicate with the data splitter 306 by establishing a pipe or socket to the data splitter 306 (especially if the data splitter 306 is a user space splitter such as the VMware vSphere APIs for I/O Filtering "VAIO" splitter). Herein a pipe refers to a communication channel between two programs or entities typically on the same machine. Pipes can use any of a number of different communication methods to transfer the data from one end of the pipe to another, including memory sharing, data copying, a TCP/IP connection, etc. A socket may be a software abstraction of a mechanism to connect to a communication channel (e.g., it is possible to "write to socket 17 to get to destination 12," etc.). The communication channel is usually pre-established, and then a socket is provided to allow interfacing to that channel. In another embodiment, the indexing splitter 302 may embed the OS/file system metadata representing the captured events in specially tagged or flagged I/O commands, so that the data splitter 306 can identify them as indexing splitter 302-related traffic and handle them accordingly. Any suitable method of tagging may be utilized. Examples of the tags may include predetermined I/O tags, predetermined flags or bits in the I/O command block, or I/O data prefixes that comprise a predetermined bit pattern or magic number. Accordingly, a direct communication channel is established between the indexing splitter 302 and the data splitter 306.

Using the communication channel with the data splitter 306, the indexing splitter 302 may transmit the file system events to the data splitter 306 as they arrive. In one embodiment, the metadata representing the file system events may be embedded in tagged I/O commands that are forwarded to the source side RPA 308 through the data splitter 306. In another embodiment, the metadata is transmitted via the pipe or socket to the data splitter 306, and the data splitter 306 may generate special (e.g., tagged) I/O commands comprising the metadata, and may further send the special (e.g., tagged) I/O commands to the source side RPA 308. Therefore, the metadata representing the file system events arrive at the source side RPA 308 embedded in the special I/O commands by way of the data splitter 306, and is identified as such accordingly by the source side RPA 308.

Since the metadata is transmitted to the source side RPA 308 interleaved together with the source side storage system I/O command data, it is timed in synchronization with the storage system data being transmitted, and is processed in the correct order at the replication protection I/O target that is in charge of I/O sequencing. The result is an accurately timed sequence of data and metadata that couples the metadata representing file system level operations with the data changes in the storage system volume.

In one embodiment, the source side RPA 308 may transmit the metadata stream to the target side RPA 310 for storage in the journal 312. The target side RPA 310 may further generate bookmarks and/or indexes useful in PiT restoration based on the metadata stream. In yet another embodiment, the source side RPA 308 may generate bookmarks and/or indexes useful in PiT restoration based on the metadata stream, and may transmit the bookmarks and/or indexes to the target side RPA 310.

It should be appreciated that using the data splitter as a communication channel eliminates the need for both VM networking configuration and configuration of the indexing agent with the IP address and other connectivity information associated with the source side RPA. Furthermore, the tight coupling between the storage system volume data being sent and the file system metadata ensures an accurate timing between the two.

Figure 4:
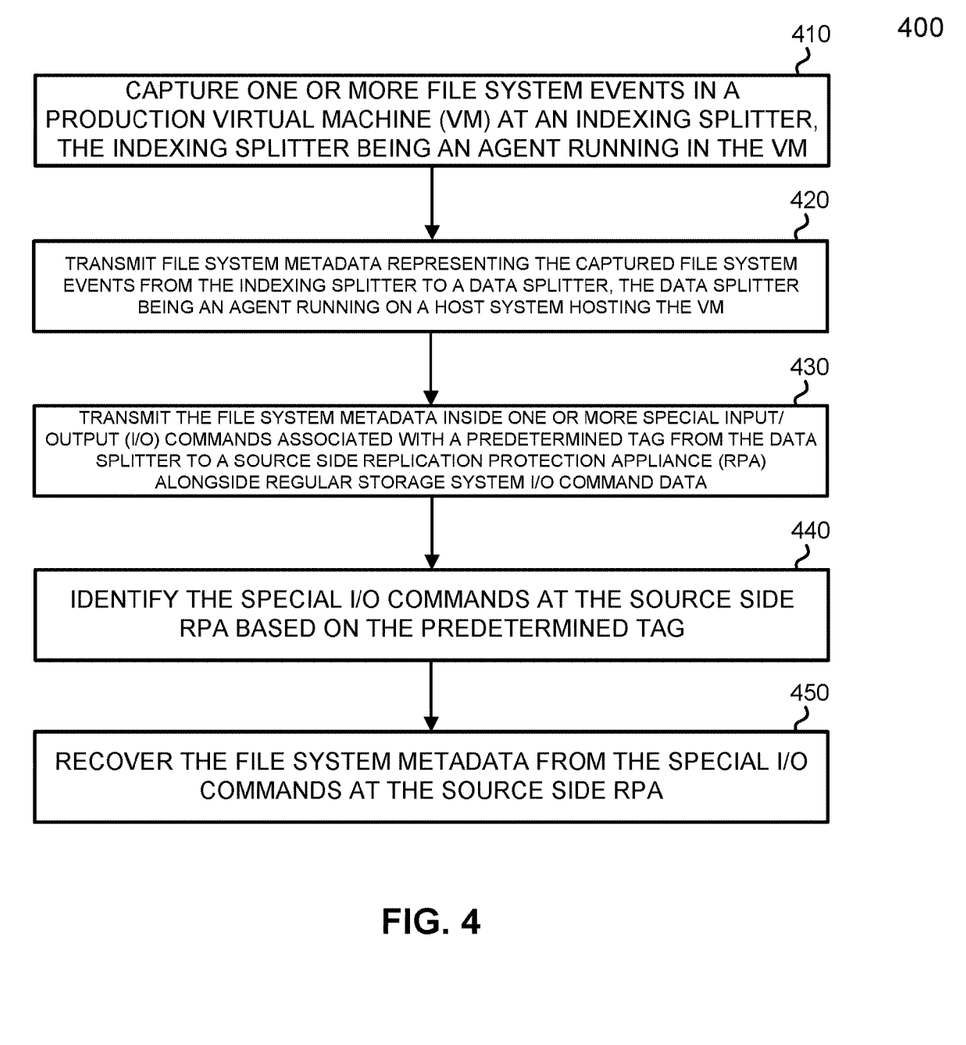
FIG. 4 is a flowchart illustrating an example method for transmitting file system metadata from an indexing splitter to a source side RPA according to one embodiment.

Referring to FIG. 4, a flowchart illustrating an example method 400 for transmitting file system metadata from an indexing splitter to a source side RPA according to one embodiment is shown. Process 400 may be performed by processing logic that includes hardware (e.g. circuitry, dedicated logic, etc.), software (e.g., embodied on a non-transitory computer readable medium), or a combination thereof. For example, process 400 may be performed by processor 1501 of FIG. 5. At block 410, one or more file system events in a production virtual machine (VM) may be captured at an indexing splitter, the indexing splitter being an agent running in the VM. At block 420, file system metadata representing the captured file system events may be transmitted from the indexing splitter to a data splitter, the data splitter being an agent running on a host system hosting the VM. At block 430, the file system metadata may be transmitted inside one or more special I/O commands associated with a predetermined tag from the data splitter to a source side RPA alongside regular storage system I/O command data. At block 440, the special I/O commands may be identified at the source side RPA based on the predetermined tag. At block 450, the file system metadata may be recovered from the special I/O commands at the source side RPA.

In one embodiment, the file system metadata may be transmitted from the indexing splitter to the data splitter via a pipe or a socket established between the indexing splitter and the data splitter, and upon identification by the data splitter of the file system metadata, the special I/O commands embedding the file system metadata may be generated at the data splitter.

In one embodiment, the special I/O commands embedding the file system metadata may be generated at the indexing splitter. In one embodiment, the file system metadata may be transmitted inside the special I/O commands from the indexing splitter to the data splitter alongside regular storage system I/O command data via an I/O path between the indexing splitter and the data splitter, and upon identification by the data splitter of the special I/O commands, the special I/O commands may be forwarded from the data splitter to the source side RPA.

In one embodiment, regular storage system I/O command data representing write transactions and the recovered file system metadata may be transmitted together from the source side RPA to a target side RPA in an interleaved fashion.

In one embodiment, the target side RPA may update a target side storage system based on the write transactions, and may store the write transactions and the file system events in a journal.

In one embodiment, bookmarks may be generated at the source side RPA based on the file system metadata.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
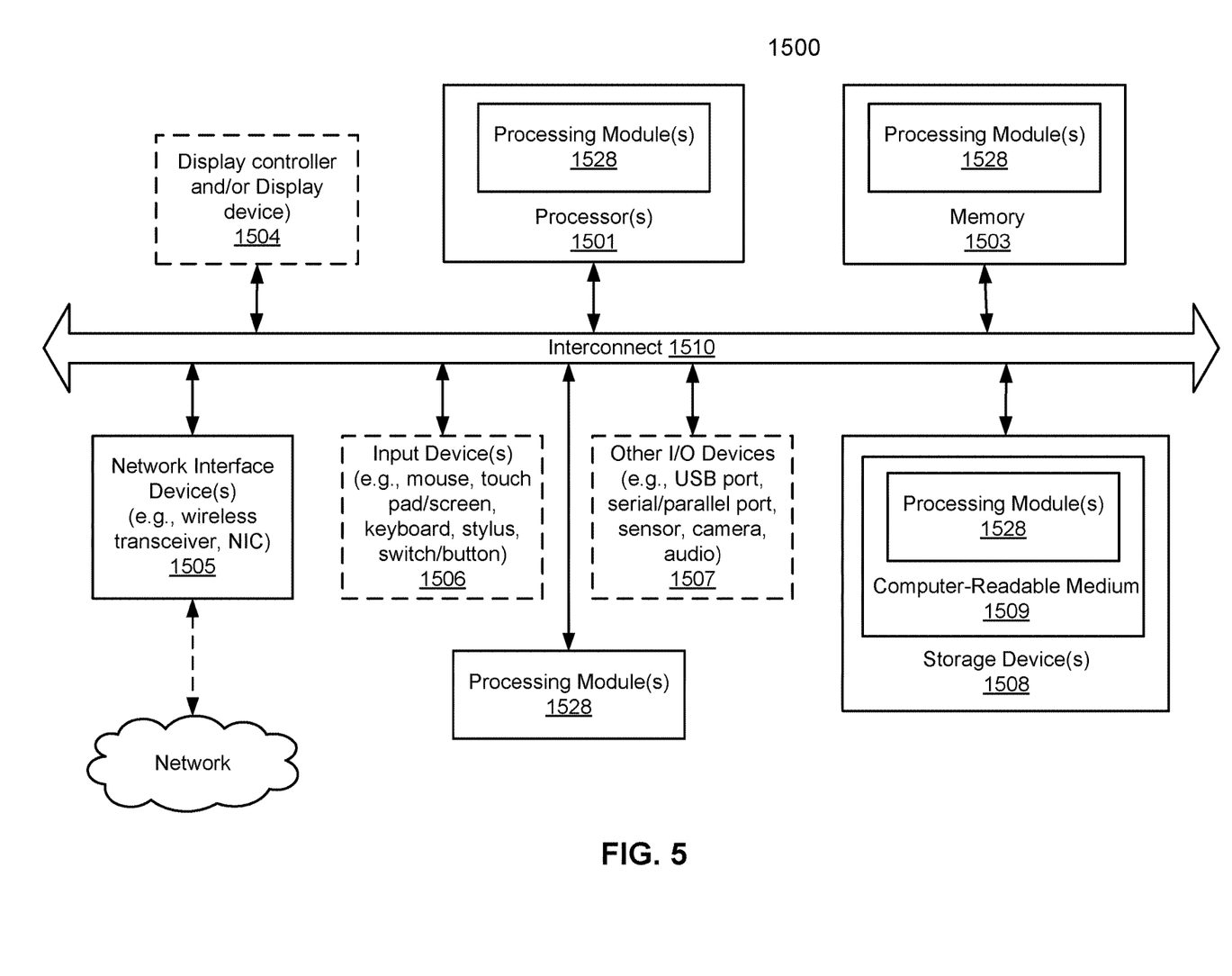
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include I/O devices such as devices 1505-1508, including network interface device(s) 1505, optional input device(s) 1506, and other optional I/O device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 1507 may include an audio device. An audio device may include a speaker and/or a microphone to facilitate voice-enabled functions, such as voice recognition, voice replication, digital recording, and/or telephony functions. Other I/O devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Therefore, embodiments of the disclosure relate to an improved method for implementing an indexing splitter in combination with a replication protection data splitter. The data splitter may be used as a communication channel. Storage system data and file system metadata may be sequenced together with a correct timing.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
capturing one or more file system events in a production virtual machine (VM) at an indexing splitter, the indexing splitter being an agent running in the VM that captures and sends out a stream of operating system (OS) level and/or file system level operation metadata;
transmitting file system metadata representing the captured file system events from the indexing splitter running in the VM to a data splitter external to the VM, the data splitter being an agent that is separate from the indexing splitter and running external to the VM on a host system hosting the VM;
transmitting the file system metadata inside one or more special input/output (I/O) commands associated with a predetermined tag from the data splitter to a source side replication protection appliance (RPA) alongside regular storage system I/O command data;
identifying the special I/O commands at the source side RPA based on the predetermined tag; and
recovering the file system metadata from the special I/O commands at the source side RPA,
wherein the file system metadata is transmitted from the indexing splitter running in the VM to the data splitter running on the host system hosting the VM via a pipe or a socket established between the indexing splitter running in the VM and the data splitter running on the host system hosting the VM, and upon identification by the data splitter of the file system metadata, the special I/O commands embedding the file system metadata are generated at the data splitter.

2. The method of claim 1, wherein the special I/O commands embedding the file system metadata are generated at the indexing splitter.

3. The method of claim 1, wherein regular storage system I/O command data representing write transactions and the recovered file system metadata are transmitted together from the source side RPA to a target side RPA in an interleaved fashion.

4. The method of claim 3, wherein the target side RPA updates a target side storage system based on the write transactions, and stores the write transactions and the file system events in a journal.

5. The method of claim 1, wherein bookmarks are generated at the source side RPA based on the file system metadata.

6. A non-transitory machine-readable medium having instructions stored therein, which when executed by a processor, cause the processor to perform data backup operations, the operations comprising:

capturing one or more file system events in a production virtual machine (VM) at an indexing splitter, the indexing splitter being an agent running in the VM that captures and sends out a stream of operating system (OS) level and/or file system level operation metadata;

transmitting file system metadata representing the captured file system events from the indexing splitter running in the VM to a data splitter external to the VM, the data splitter being an agent that is separate from the indexing splitter and running external to the VM on a host system hosting the VM;

transmitting the file system metadata inside one or more special input/output (I/O) commands associated with a predetermined tag from the data splitter to a source side replication protection appliance (RPA) alongside regular storage system I/O command data;

identifying the special I/O commands at the source side RPA based on the predetermined tag; and recovering the file system metadata from the special I/O commands at the source side RPA, wherein the file system metadata is transmitted from the indexing splitter running in the VM to the data splitter running on the host system hosting the VM via a pipe or a socket established between the indexing splitter running in the VM and the data splitter running on the host system hosting the VM, and upon identification by the data splitter of the file system metadata, the special I/O commands embedding the file system metadata are generated at the data splitter.

7. The non-transitory machine-readable medium of claim 6, wherein the special I/O commands embedding the file system metadata are generated at the indexing splitter.

8. The non-transitory machine-readable medium of claim 6, wherein regular storage system I/O command data representing write transactions and the recovered file system metadata are transmitted together from the source side RPA to a target side RPA in an interleaved fashion.

9. The non-transitory machine-readable medium of claim 8, wherein the target side RPA updates a target side storage system based on the write transactions, and stores the write transactions and the file system events in a journal.

10. The non-transitory machine-readable medium of claim 6, wherein bookmarks are generated at the source side RPA based on the file system metadata.

11. A data processing system, comprising:
a processor; and
a memory coupled to the processor to store instructions, which when executed by the processor, cause the processor to perform data backup operations, the operations including:

capturing one or more file system events in a production virtual machine (VM) at an indexing splitter, the indexing splitter being an agent running in the VM that captures and sends out a stream of operating system (OS) level and/or file system level operation metadata;

transmitting file system metadata representing the captured file system events from the indexing splitter running in the VM to a data splitter external to the VM, the data splitter being an agent that is separate from the indexing splitter and running external to the VM on a host system hosting the VM;

transmitting the file system metadata inside one or more special input/output (I/O) commands associated with a predetermined tag from the data splitter to a source side replication protection appliance (RPA) alongside regular storage system I/O command data;

identifying the special I/O commands at the source side RPA based on the predetermined tag; and recovering the file system metadata from the special I/O commands at the source side RPA, wherein the file system metadata is transmitted from the indexing splitter running in the VM to the data splitter running on the host system hosting the VM via a pipe or a socket established between the indexing splitter running in the VM and the data splitter running on the host system hosting the VM, and upon identification by the data splitter of the file system metadata, the special I/O commands embedding the file system metadata are generated at the data splitter.

12. The data processing system of claim 11, wherein the special I/O commands embedding the file system metadata are generated at the indexing splitter.

13. The data processing system of claim 11, wherein regular storage system I/O command data representing write transactions and the recovered file system metadata are transmitted together from the source side RPA to a target side RPA in an interleaved fashion.

14. The data processing system of claim 13, wherein the target side RPA updates a target side storage system based on the write transactions, and stores the write transactions and the file system events in a journal.

15. The data processing system of claim 11, wherein bookmarks are generated at the source side RPA based on the file system metadata.

* * * * *